(12) United States Patent
Sebert

(10) Patent No.: US 7,216,859 B2
(45) Date of Patent: May 15, 2007

(54) DAMPING ARRANGEMENT

(75) Inventor: Karl Sebert, Kirchheim/Teck (DE)

(73) Assignee: Sebert Schwingungstechnik GmbH, Kirchheim/Teck (DE)

(*) Notice: Subject to any disclaimer, the term of this patent is extended or adjusted under 35 U.S.C. 154(b) by 0 days.

(21) Appl. No.: 10/637,540

(22) Filed: Aug. 11, 2003

(65) Prior Publication Data
US 2004/0032067 A1  Feb. 19, 2004

Related U.S. Application Data

(62) Division of application No. 09/705,706, filed on Nov. 6, 2000, now Pat. No. 6,629,688.

(30) Foreign Application Priority Data

Nov. 5, 1999  (DE) ............................. 199 53 455
Aug. 2, 2000  (DE) ............................. 100 37 581

(51) Int. Cl.
*F16F 1/18* (2006.01)
*F16F 1/36* (2006.01)

(52) U.S. Cl. ............... 267/160; 267/147; 267/136

(58) Field of Classification Search .............. 267/136, 267/145, 148, 160, 161
See application file for complete search history.

(56) References Cited

U.S. PATENT DOCUMENTS

| | | | |
|---|---|---|---|
| 2,594,665 A | 4/1952 | Lockwood | |
| 2,755,079 A | 7/1956 | York et al. | |
| 2,778,629 A | 1/1957 | Johnson et al. | |
| 3,844,545 A | 10/1974 | Pershin et al. | |
| 4,499,772 A | 2/1985 | Haas | |
| 4,783,038 A | 11/1988 | Gilbert et al. | |
| 5,121,905 A * | 6/1992 | Mann et al. | 267/141.4 |
| 5,149,066 A | 9/1992 | Snaith et al. | |
| 5,169,110 A | 12/1992 | Snaith et al. | |
| 5,280,889 A | 1/1994 | Amil et al. | |
| 5,310,025 A | 5/1994 | Anderson | |
| 5,791,636 A | 8/1998 | Loziuk | |
| 5,897,093 A | 4/1999 | Le Derf | |
| 6,164,023 A | 12/2000 | Horikiri et al. | |
| 6,299,150 B1 | 10/2001 | Allen et al. | |

FOREIGN PATENT DOCUMENTS

EP     816709 A2    1/1998

* cited by examiner

*Primary Examiner*—Melody M. Burch
(74) *Attorney, Agent, or Firm*—Browdy and Neimark, PLLC

(57) ABSTRACT

A damping arrangement is proposed with at least two holding devices (10, 11) that are connected to one another via at least one damping element (12) in the form of a plane element made of a wire mesh or wire fabric, said holding devices (10, 11) being secured to at least two different regions of the damping element (12), and said damping element (12) having at least two curvatures in opposite directions between the holding devices (10, 11). A damping arrangement of this type may be produced cost-effectively in an automated process in such a way that the damping element is constructed to have substantially the same elastic stiffnesses in three mutually orthogonal directions.

11 Claims, 5 Drawing Sheets

DAMPING ARRANGEMENT

This application is a division of U.S. patent application Ser. No. 09/705706 filed Jul. 6, 2000 now U.S. Pat. No. 6,629,688.

BACKGROUND OF THE INVENTION

The present invention relates to a damping arrangement having at least two holding devices that are connected to one another via a damping element.

In one damping arrangement of this type, which is known from DE-GM 7306006.7, the damping element consists of a multitude of wire ropes. A system of this type has the shortcoming that the elastic stiffness is significantly lower in the shearing direction than in the pull or push direction, which may lead to stability problems under a load.

From U.S. Pat. No. 2,778,629, a damping arrangement is known wherein two grid-like elements in the form of spherical segment areas are fixed to one another at the centers of their outer surfaces. In the wedge-shaped gap a coil spring is provided, which is elastically displaced outward when a force presses the two segments together. The two grid-like segments are not secured at their circumferences, so that the entire arrangement can dampen only forces in the push direction but not in the pull direction. Furthermore, the installation of this known damping arrangement is complex and expensive.

SUMMARY OF THE INVENTION

It is an object of the present invention to create a damping arrangement that can be implemented very easily and cost effectively and has properly proportioned damping properties in all three spatial directions.

This object is met according to the invention with a damping arrangement having two holding devices that are connected to one another via at least one damping element in the form of a plane element made of wire mesh or wire fabric, said holding devices being secured to two different regions of the damping element, and said damping element having at least two curvatures in opposite directions between the holding devices.

The advantages of the inventive damping arrangement lie especially in the fact that the dual wedging in the two holding devices renders the desired damping properties in all three spatial directions simple and cost effective to implement, and a damping arrangement of this type is well suited for the automated production and also for the mass production. A great number of different shapes and designs can be implemented. The elastic stiffness and the damping properties in the different directions may be adjusted and optimized by the shaping and type of the mesh. The design of the holding devices, too, may be used to achieve that the spacing of the securing locations may vary independently from the elasticity/damping characteristics, thus permitting use of the damping arrangement even where space is limited, i.e., an adjustment to the given installation conditions can be made in an improved fashion. It is easily possible to create identical characteristics for pull and pressure loads, and even identical elastic stiffnesses can be attained in all three spatial directions. During standstill after stress, a relaxation effects sets in, i.e., after a certain period of rest the damping arrangement has regained original properties. Compared to other systems, the inventive damping arrangement is thermally considerably less critical since the conversion of kinetic energy via friction takes place on a large surface and not inside a massive structure, as is the case, for example, in rubber buffer or wire rope dampers.

The measures listed in the subclaims permit advantageous further developments and improvements of the damping arrangement defined in claim 1.

In a first advantageous embodiment, the first ring-like holding device is secured to the edge region of the circumference side of the damping element, which has a circular circumference shape, and the second holding device is secured in the center of the damping element. The second holding device is preferably secured, especially screwed in, at a central holding hole of the damping element, and preferably has a substantially mushroom-like shape.

The damping element forms a kind of dome in such a way that both the horizontal and the vertical stiffness can be changed in opposite directions via the height of the dome. With a constant dome diameter and larger dome height the damping arrangement becomes harder vertically because more friction points are present; horizontally, on the other hand, it becomes softer.

In a further advantageous design, the two ring-like holding devices are secured to the opposite edge regions of the tubular damping element having a circular circumference line.

The circular edge region of the damping element is advantageously wedged in between two regions of the ring-like holding device, with the two regions preferably being formed as ring elements that are screwed, glued, riveted or welded to one another.

In a further design, two holding devices may also be arranged on parallel edge regions of the rectangle-shaped damping element and, depending on the desired damping effect, multiple damping elements may also be arranged side by side and/or perpendicular to one another.

In a simple constructive design, the damping element may also be curved in an S-shape and especially formed tape-like. Furthermore, in an alternative design, a third holding device may be secured substantially centrical and parallel between the two holding devices that are secured to the edge.

Lastly, two holding devices may also be secured to opposite regions of a tubular damping element in the longitudinal direction of the same.

As a particularly simple and cost effective solution, a damping arrangement may be provided that has two holding devices that are connected to one another via at least one damping element in the form of a plane element made from a wire mesh or wire fabric, with the holding devices secured to two opposite parallel edge regions of the damping element, and with the damping element having a semi-circle-like curvature between the holding devices. This solution offers similar advantages as the above-described embodiments, even though the damping element does not have two curvatures in opposite directions.

The holding devices advantageously each consist of two rectangle-shaped regions for wedging in the damping element between them and are preferably screwed, glued, riveted or welded together. As an alternative, in a simpler embodiment, the holding devices may also be designed as sheet metal parts that encompass the respective edge region of the damping element in a U-shape and whose two sides are provided with securing holes that are in alignment with one another.

In an embodiment that has proven particularly advantageous, at least one of the regions of the holding device has a deflection surface that deflects the edge region of the damping element, with the deflection angle preferably being larger than 120°.

The damping element is preferably formed as a plane element having at least one layer, and the wire mesh or wire fabric may consist of metal wire or plastic. The desired properties may be attained by means of the number and arrangement of meshes, as well as by means of the thickness and the spacing of the individual wires.

BRIEF DESCRIPTION OF THE DRAWINGS

Embodiments of the invention are shown in the drawing and explained more specifically in the following description. In the drawing.

DETAILED DESCRIPTION OF THE EMBODIMENTS

Figure 1:
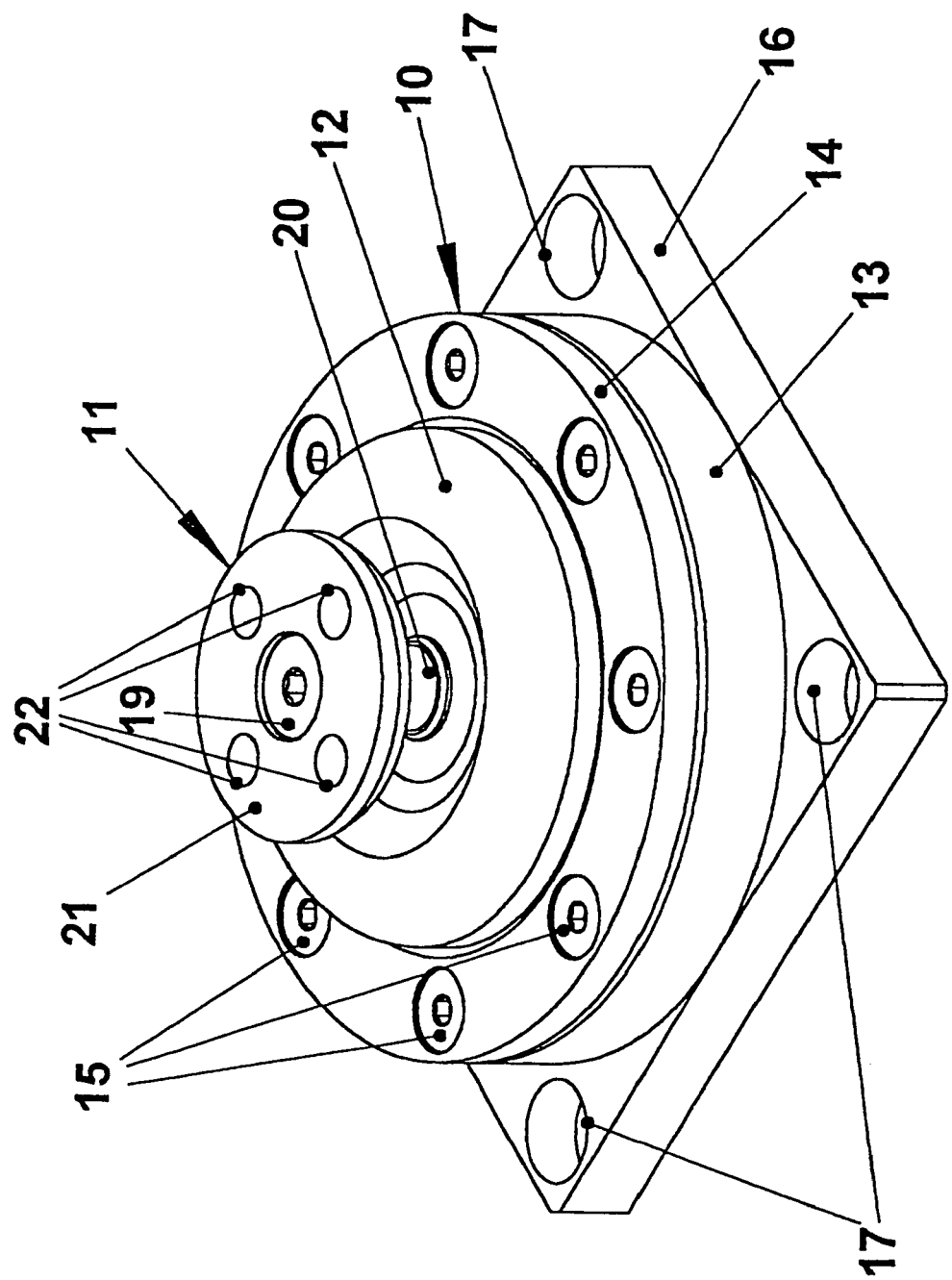
FIG. 1 shows a perspective view of a first embodiment of a damping arrangement with a dome-like damping element.
Figure 2:
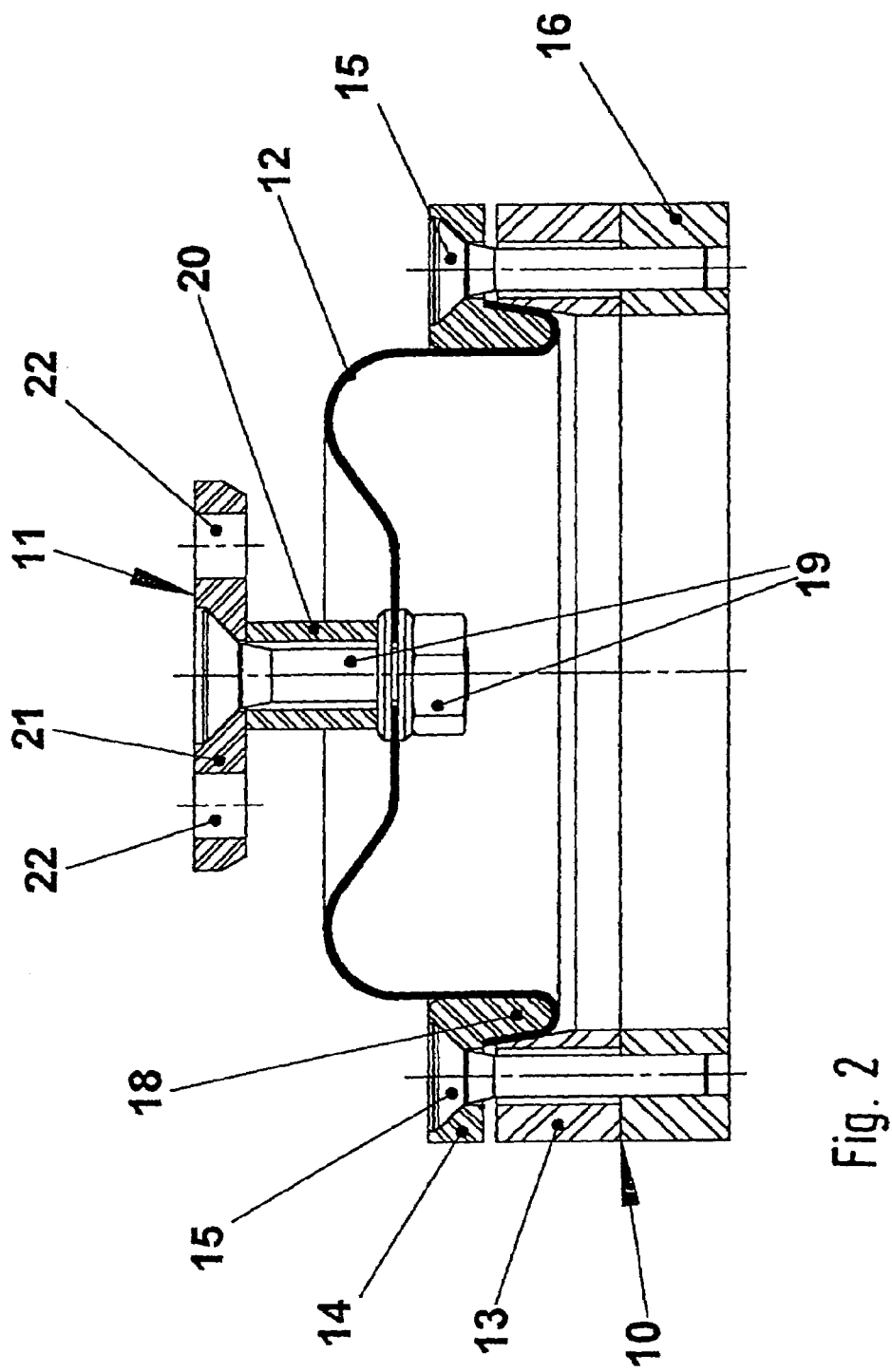
FIG. 2 shows a cross-section of the embodiment shown in FIG. 1.

The embodiment of a damping arrangement shown in FIGS. 1 and 2 substantially comprises two holding devices 10, 11, which are connected to one another via a damping element 12 in the form of a plane element made of a wire mesh or wire fabric. The damping element 12 may be formed as a one-layer mesh or fabric, however, embodiments with multiple layers are possible as well. The wires are preferably metallic wires, however, plastic wires are possible as well.

The first holding device 10 consists of two ring regions 13, 14, that are screwed to one another by means of eight holding screws 15 that are distributed along the circumference. The edge region of the circumference side of the damping element 12, which has a circular circumference line, is wedged in between, and thus secured to the holding device 10 on the circumference side. The lower holding device 10, as viewed in FIGS. 1 and 2, also has a lower rectangle-shaped offset region 16, which is formed on integrally and has four holding holes 17 to receive four holding screws that are not shown, whereby the entire damping arrangement can be secured to a base or to a part that is to be held damped and/or held elastically relative to some other part.

In the assembled condition, the upper ring region 14 engages into the lower ring region 13 with a torus-like projection in such a way that a slanted holding surface is formed between the torus-like projection 18 and the lower ring region 13, with the aid of which the outer edge region of the damping element 12 is held in place.

The damping element 12 extends from the wedging location along the torus-like projection 18 away from the lower ring region 13 in an upward direction such that a deflection takes place by approximately 160°. The damping element 12, which is shaped dome-like, then extends, with a counter-curvature, from all sides toward the center where the upper holding device 11 is secured to a central holding hole of the damping element 12 by means of a holding screw 19. The damping element 12 is wedged in between the holding screw 19 and a foot 20 of the mushroom-like holding device 11 and thus secured. The disk-like hat region 21 of the holding device 11 in turn has four holding holes 22 distributed along its circumference, to fasten the holding device 11 by means of holding screws that are not shown to a second part that is not shown, which is to be held elastically or damped relative to the first part.

The damping element 12 serves to reduce mechanical vibrations and shock-like stresses between the two parts that are not shown, i.e., to provide a damping or elastic mounting, with the damping properties and elastic properties determined by the shaping of the damping element 12, the type of holding devices 10, 11, and the parameters of the mesh or fabric, i.e., by the material, the material diameter, the mesh width, the crossing angle, and the like. Desired properties may also be achieved through multi-layered damping elements 12. Via the dome height of the dome-like damping element 12, the horizontal and also the vertical stiffness may be changed in opposite directions, i.e., there is a point at which the damping arrangement has identical elastic stiffnesses in all three spatial directions. With a constant dome diameter and larger dome height the damping arrangement becomes harder vertically because more friction points of the wires of the mesh are present; horizontally, on the other hand, it becomes softer.

The mesh-based damping element 12 can be designed, through the shaping of the mesh, in such a way that it has a higher, identical, or lower elastic stiffness in the shearing direction than in the pull or push direction. For this, it is essential that the damping element 12 has, between the two holding devices 10, 11, at least two curvatures in opposite directions, which permit a substantially continuous damping movement in the different directions.

In a variation of the shown embodiment, the ring regions 13, 14 of the lower holding device 10 may also be riveted, glued or welded to one another. A securing by clamping disks or by a beaded edge on a holding device made of sheet steel is conceivable as well. Asymmetric designs are possible as well, in which, for example, the second holding device 11 does not have to be secured in the center of the damping element 12. A circular or ring-shaped design also is not mandatory, instead other designs, such as ellipse-shaped, rectangle-shaped, square, polygonal forms are possible as well.

Figure 3:
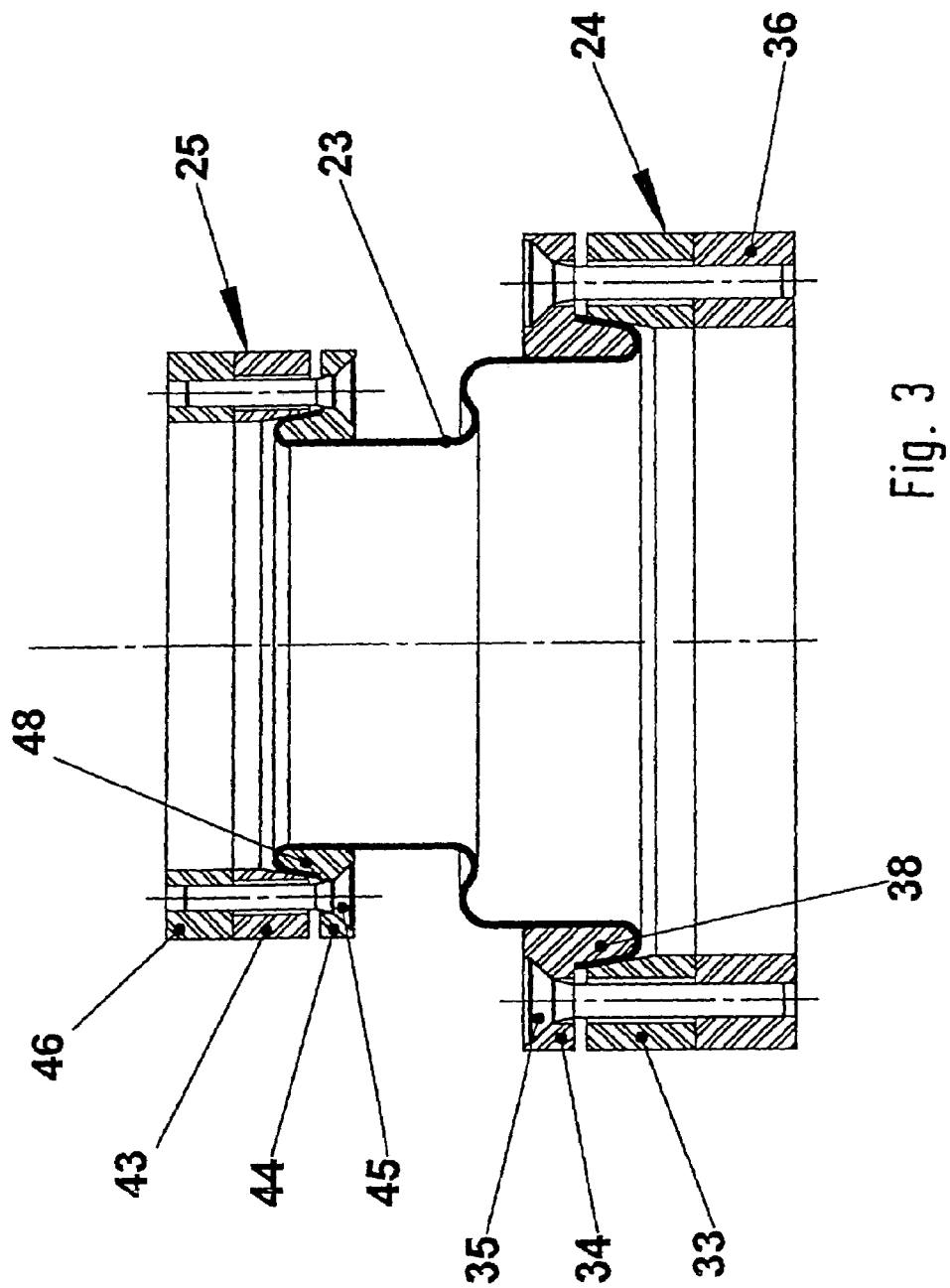
FIG. 3 shows a cross section of a second embodiment with two ring-shaped holding devices.

The second embodiment shown in FIG. 3 has many identical elements and component groups, which are marked with the same reference numerals and are not described again in detail. In contrast to the first embodiment, a damping element 23 is no longer formed dome-like but tubular, also with multiple curvatures in opposite directions provided in the mesh or wire fabric. The two holding devices 24, 25 substantially correspond in their design to the holding device 10 of the first embodiment and serve to fasten the two circular edge regions of the tubular damping element 23. The component parts of the lower holding device 24 have reference numerals that are each increased by the number 20 from those of the holding device 10, and those of the holding device 25 have reference numerals that are each increased by the number 30.

In a modification of the second embodiment, the holding devices 24, 25, may also be designed rectangle-shaped, with the tubular damping element 23 also having a rectangle-like cross section. The edges may be rounded.

In a further alternative to the second embodiment, an arrangement of rectangle-shaped damping elements, which are secured with their opposite edge regions to the holding devices 24, 25, may be used in the rectangle-shaped design of the holding devices 24, 25 in place of a tubular damping element 23. These damping elements may then be arranged parallel and/or at a right angle to one another in such a way that at least two such damping elements are provided, with a larger number possible, however.

In a further alternate embodiment of the first embodiment, the mushroom-like holding device 11 may also extend in the opposite direction, i.e., through the holding device 10, in such a way that the foot 20 can then be extended, depending on the application.

In a simpler design, the torus-like projections 18 may also be dispensed with, and the respective damping element is secured in or on a similar holding device in a different manner.

In the first embodiment, the rectangular region 16 may be screwed to the ring regions 13, 14, or formed onto the ring region 13 in one piece. Depending on the application it may also be dispensed with or substituted by a differently formed holding device. The same also applies to the remaining embodiments, of course.

Figure 4:
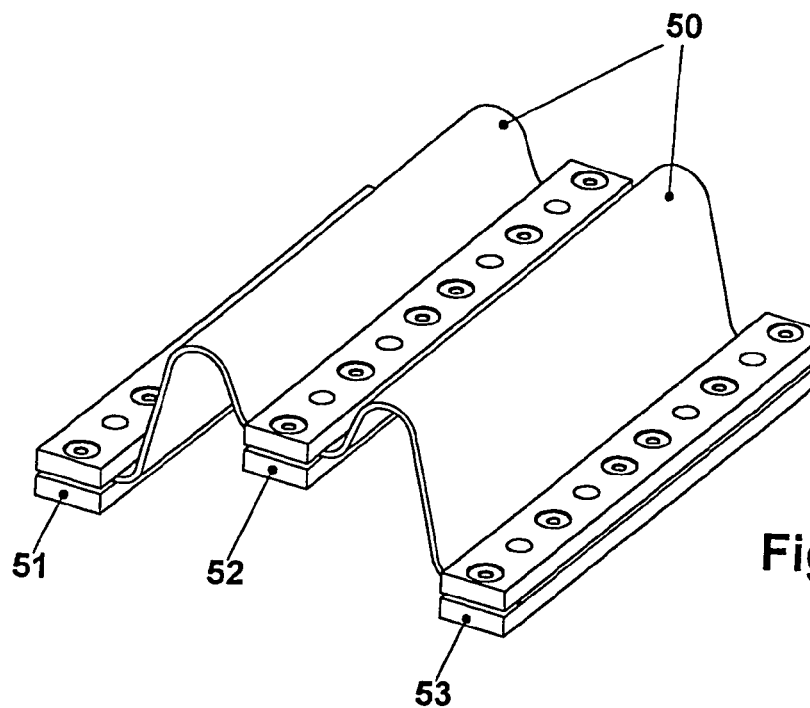
FIG. 4 shows a perspective view of a third embodiment with three parallel strip-like holding devices.

In the third embodiment shown in FIG. 4, a rectangle-shaped damping element 50 has three parallel, strip-like holding devices 51–53, each consisting of two partial holding devices that are riveted to one another. Two parallel edge regions of the damping element 50 are wedged in between the partial holding devices of the strip-like holding devices 51 and 53, while the center region of the damping element 50 is wedged in symmetrically between the partial holding devices of the strip-like holding device 52. Similar to the previous embodiments, the mesh damping element 50 here also has three curvatures in opposite directions between the holding devices 51 and 52, and also between the holding devices 52 and 53; and a projection corresponding to the torus-like projection 18, or a corresponding shaping element may principally also be provided.

In an alternate design, the middle holding device 52 may, for special applications, also be arranged asymmetrically to the two remaining holding devices 51 and 53. Furthermore, instead of a rivet connection, the partial holding devices may also be screwed, glued or wedged to one another.

Figure 5:
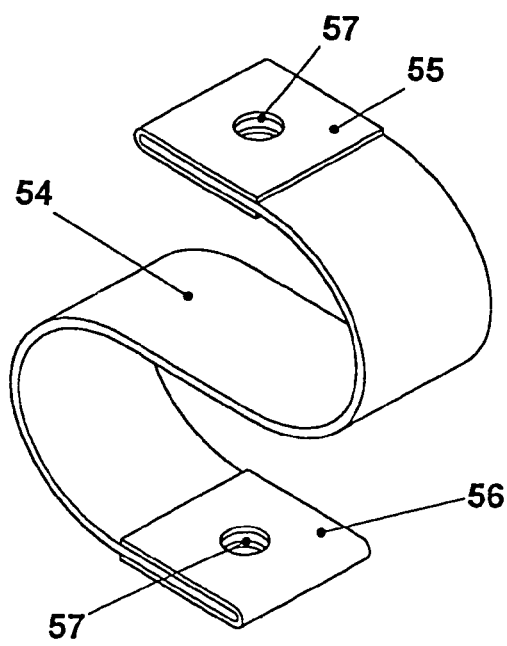
FIG. 5 is a perspective view of a fourth embodiment with a tape-like damping element that is curved in an S-shape.

In the fourth embodiment shown in FIG. 5, a tape-like damping element 54 that is curved in an S-shape has, on its respective unattached end sections, two holding devices 55, 56, which are designed as sheet metal parts that encompass the respective edge region in a U-shape. These sheet metal parts may, for example, be bent around the given edge region in a simple manner. Through holes 57 that are in alignment with one another extend through the two sides of the holding devices 55, 56, as well as through the interposed damping element 54. By means of holding screws, which are not shown, the damping element 54 may be secured by the holding devices 55, 56 between two arrangements that are to be buffered.

Wedge-in type holding devices according to the third embodiment shown in FIG. 4 may, of course, be used in place of the holding devices 55, 56. Furthermore, the tape-like damping element 54 may also have further additional curvatures in addition to the two shown curvatures in opposite directions. The tape-like damping element 54 may, of course, have any desired width.

Figure 6:
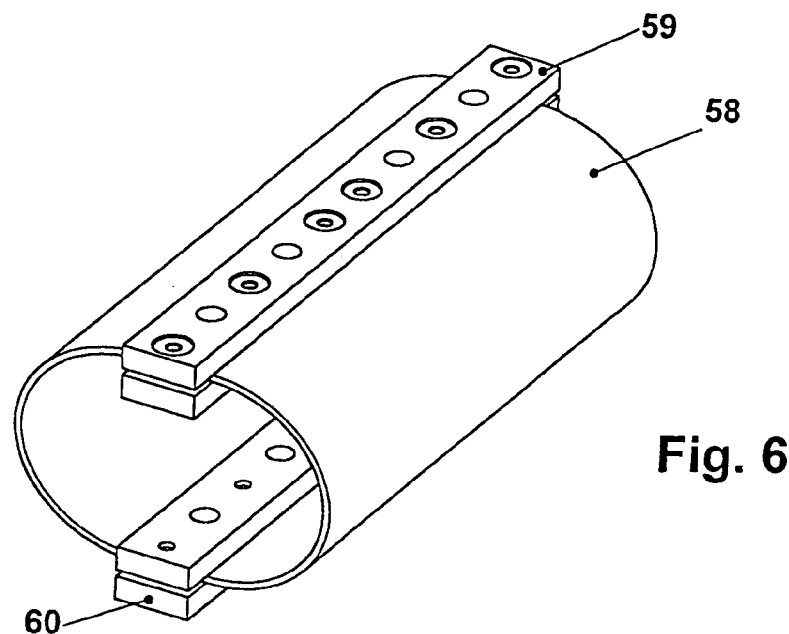
FIG. 6 is a perspective view of a fifth embodiment with a tubular damping element and two strip-shaped holding devices that are secured opposite one another in the longitudinal direction of the damping element.

In the fifth embodiment shown in FIG. 6, a tubular damping element 58 is held between two strip-like holding devices 59, 60, which, as in the third embodiment, consist of two partial holding devices that are screwed, riveted, glued or wedged to one another and that wedge the damping element 58 in between them. The two holding devices 59, 60 are arranged parallel and opposite to one another in the longitudinal direction of the damping element 58. The damping element 58 thus extends starting from one holding device, over two arc elements with curvatures in opposite directions, to the other holding device.

Figure 7:
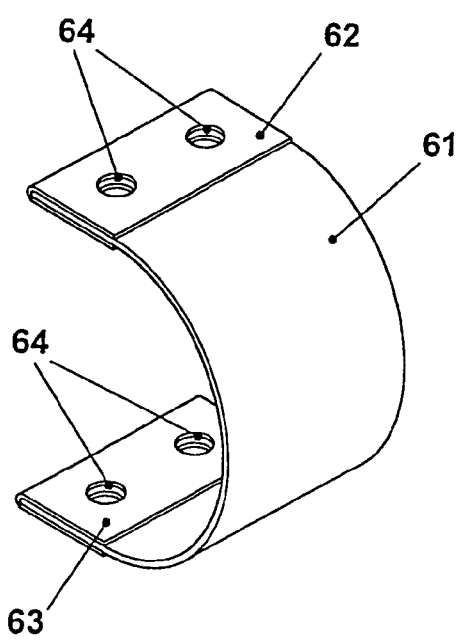
FIG. 7 is a perspective view of a sixth embodiment with a damping element that is curved in a semi-circle.

The sixth embodiment shown in FIG. 7 is designed similar to the fourth embodiment shown in FIG. 5, however it consists of only one tape-like damping element 61 that is curved like a semi-circle, the unattached end sections of which are held in two holding devices 62, 63, which substantially correspond to the holding devices 55, 56 but, due to their larger width, each have two through holes 64.

The sixth embodiment shown in FIG. 7 represents a simplified and cost-effective variation of the embodiment shown in FIG. 5, however, there is less danger of bottoming in the fourth embodiment.

Particularly in the embodiments shown in FIG. 4 through 7 the damping properties may be improved further by having the wires of the wire mesh of the damping elements 50, 54, 58, 61 extend not parallel or perpendicular to the holding devices but diagonal to them, for which an angle of 45°, for example, is particularly suitable. A parallel or perpendicular orientation is also possible, of course.

What is claimed is:

1. A damping arrangement having at least two holding devices (10, 11; 24, 25) that are connected to one another via at least one damping element (12; 23) in the form of a plane element made of a wire mesh or wire fabric, said plane element having a center region and an edge region, each said region having a closed circumference, each of said at least two holding devices (10, 11; 24, 25) being secured directly to only a respective one of said regions of said at least one damping element (12; 23), said at least one damping element (12; 23) having at least two curvatures in opposite directions between said at least two holding devices (10, 11; 24, 25), one of said at least two holding devices is a first ring-like holding device (10) secured to said edge region of said at least one damping element (12), said edge region having a circular circumference line, the other one of said at least two holding devices is a second holding device (11) secured to the center region of said at least one damping element (12), and said center region and said edge region of said plane element are capable of being spaced apart from one another in an axial direction perpendicular to said closed circumferences,
wherein said at least one damping element is constructed to have substantially the same elastic stiffness in three mutually orthogonal directions.

2. A damping arrangement as defined in claim 1, characterized in that the second holding device (11) is secured at a central holding hole enclosed by said center region of said at least one damping element (12).

3. A damping arrangement as defined in claim 1, characterized in that the second holding device (11) has a substantially mushroom-like shape.

4. A damping arrangement as defined in claim 1, characterized in that said at least one damping element is a tubular damping element extending between said center region and said edge region, said center region and said edge region each have a circular circumference line, and said at least two holding devices (24, 25) are each secured to a respective one of the center region and edge region of said at least one tubular damping element (23) at a respective circular circumference line.

5. A damping arrangement as defined in claim 1, characterized in that one of said regions of said at least one damping element (12; 23) is wedged in between two regions (13, 14; 33, 34; 43, 44) of one of said at least two holding devices (10; 24; 25).

6. A damping arrangement as defined in claim 5, characterized in that the two regions (13, 14; 33, 34; 43, 44) of said one of said at least two holding devices are designed as ring elements that are screwed, glued, riveted or welded to one another.

7. A damping arrangement as defined in claim 5, characterized in that at least one of the regions (14; 34; 44) of said one of said at least two holding devices (10; 24; 25) has a deflecting surface (18; 38; 48) that deflects one of the edge region and the center region of said at least one damping element (12; 23).

8. A damping arrangement as defined in claim 6, characterized in that at least one of the regions (14; 34; 44) of said one of said at least two holding devices (10; 24; 25) has a deflecting surface (18; 38; 48) that deflects one of the edge region and the center region of said at least one damping element (12; 23).

9. A damping arrangement as defined in claim 1, wherein said at least one damping element consists of one layer of wire mesh or wire fabric.

10. A damping arrangement as defined in claim 1, wherein said at least one damping element comprises a plurality of layers of wire mesh or wire fabric.

11. A damping arrangement as defined in claim 1, wherein said at least one damping element is configured and connected to said holding devices to produce damping effects in three mutually orthogonal directions.

* * * * *